(12) United States Patent
Shon et al.

(10) Patent No.: US 9,113,393 B2
(45) Date of Patent: Aug. 18, 2015

(54) SYSTEM, METHOD AND APPARATUS FOR WIRELESS NETWORK CONNECTION USING NEAR FIELD COMMUNICATION

(75) Inventors: Tae-Shik Shon, Gyeonggi-do (KR); Yong-Suk Park, Seoul (KR); Soon-Seob Han, Seoul (KR); Jeong-Sik In, Gyeonggi-do (KR); Bong-Wan Jun, Seoul (KR); Tae-Won Ahn, Chungcheongnam-do (KR); Eui-Jik Kim, Gyeonggi-do (KR); Bon-Hyun Koo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 606 days.

(21) Appl. No.: 12/857,175

(22) Filed: Aug. 16, 2010

(65) Prior Publication Data

US 2011/0039494 A1    Feb. 17, 2011

(30) Foreign Application Priority Data

Aug. 14, 2009   (KR) ........................ 10-2009-0075440

(51) Int. Cl.
*H04B 7/00*     (2006.01)
*H04W 48/10*    (2009.01)
*H04W 8/00*     (2009.01)
(Continued)

(52) U.S. Cl.
CPC .............. *H04W 48/10* (2013.01); *H04W 8/005* (2013.01); *H04W 48/08* (2013.01); *H04W 84/18* (2013.01)

(58) Field of Classification Search
CPC ... H04W 28/18; H04W 28/24; H04W 74/006; H04W 84/18; H04W 40/246; H04W 92/18; H04W 24/00; H04L 2209/80; H04L 1/0025; H04L 41/0893; H04L 63/0428; H04L 63/062; H04L 67/18

USPC ......... 455/41.1, 41.2, 554.2, 424, 556.1, 509; 370/338, 347, 397, 255, 331, 400
See application file for complete search history.

(56) References Cited

U.S. PATENT DOCUMENTS

| 7,512,081 | B2 | 3/2009 | Ayyagari et al. | |
| 2003/0233551 | A1* | 12/2003 | Kouznetsov et al. | ......... 713/175 |
| 2004/0063458 | A1* | 4/2004 | Hori et al. | ................. 455/554.2 |

(Continued)

FOREIGN PATENT DOCUMENTS

| EP | 1 274 194 | 1/2003 |
| EP | 1 793 531 | 6/2007 |

(Continued)

OTHER PUBLICATIONS

Korean Office Action dated May 28, 2015 issued in counterpart application No. 10-2009-0075440.

*Primary Examiner* — Golam Sorowar
(74) *Attorney, Agent, or Firm* — The Farrell Law Firm, P.C.

(57) ABSTRACT

A system, method, and apparatus are provided for establishing a wireless network connection between a mobile terminal and an electronic apparatus by using a near field communication network. At least one electronic apparatus is connected to the near field communication network. A mobile terminal is connected to the near field communication network, exchanges information with the at least one electronic apparatus for a wireless communication network connection through the connected near field communication network, and establishes the wireless communication network connection with the at least one electronic apparatus based on the exchanged information.

4 Claims, 15 Drawing Sheets

(51) Int. Cl.
   *H04W 84/18*    (2009.01)
   *H04W 48/08*    (2009.01)

(56)     References Cited

U.S. PATENT DOCUMENTS

2005/0286478  A1*  12/2005  Mela et al. ................... 370/338
   2006/0062190  A1*   3/2006  Suga ............................. 370/338
   2006/0165035  A1    7/2006  Chandra et al.
   2007/0225037  A1*   9/2007  Koike ........................ 455/556.1
   2008/0137556  A1*   6/2008  Park et al. ................... 370/255
   2008/0285520  A1*  11/2008  Forte et al. .................. 370/331
   2008/0298375  A1*  12/2008  Agardh et al. ............... 370/397
   2009/0196258  A1*   8/2009  Escobar Sanz et al. ....... 370/332
   2009/0310583  A1*  12/2009  Suzuki ......................... 370/338
   2010/0281525  A1*  11/2010  Nakajima ....................... 726/5

FOREIGN PATENT DOCUMENTS

KR       1020060093027         8/2006
   WO       WO 2006/027725        3/2006

* cited by examiner

| FRAME CONTROL (1) | FRAME COUNTER (4) | COMMAND IDENTIFIER (1) | COMMAND PAYLOAD (CHANGEABLE) | FRAME CHECKSUM (4) |

FIG.5A

| | |
|---|---|
| 0x0A | NETWORK MODE NOTIFICATION |
| 0x0B | AP INFO REQUEST |
| 0x0C | AP INFO RESPONSE |
| 0x0D | AD HOC INFO REQUEST |
| 0x0E | AD HOC INFO RESPONSE |
| 0x0F | NETWORK ESTABLISHMENT NOTIFICATION |

FIG.5B

| FRAME CONTROL (1) | FRAME COUNTER (4) | COMMAND IDENTIFIER (1) | NETWORK MODE (1) | FRAME CHECKSUM (4) |
|---|---|---|---|---|

FIG.6A

| NETWORK MODE VALUE | DESCRIPTION |
|---|---|
| 0x00 | NO |
| 0x01 | AD HOC MODE |
| 0x02 | INFRASTRUCTURE MODE |

FIG.6B

| FRAME CONTROL (1) | FRAME COUNTER (4) | COMMAND IDENTIFIER (1) | FRAME CHECKSUM (4) |
|---|---|---|---|

FIG.7A

| FRAME CONTROL (1) | FRAME COUNTER (4) | COMMAND IDENTIFIER (1) | AP INFO (16) | FRAME CHECKSUM (4) |
|---|---|---|---|---|

FIG.7B

| AP INFO VALUE | DESCRIPTION |
|---|---|
| xxxxxx (6) | SSID OF AP |
| 00x00 OR 0x01 (1) | NETWORK AUTHENTICATION (PUBLIC OR SHARED) |
| 0x00 OR 0x01 (1) | DATA ENCRYPTION (NONE OR WEP) |
| xxxxxxxx (8) | WEP KEY OF AP |

FIG.7C

| FRAME CONTROL (1) | FRAME COUNTER (4) | COMMAND IDENTIFIER (1) | NETWORK SETTING (1) | FRAME CHECKSUM (4) |
|---|---|---|---|---|

FIG.7D

| NETWORK SETTING VALUE | DESCRIPTION |
|---|---|
| 0x00 | SUCCESS |
| 0x01 | FAILURE |

FIG.7E

| FRAME CONTROL (1) | FRAME COUNTER (4) | COMMAND IDENTIFIER (1) | FRAME CHECKSUM (4) |
|---|---|---|---|

FIG.10A

| FRAME CONTROL (1) | FRAME COUNTER (4) | COMMAND IDENTIFIER (1) | AD HOC INFO (20) | FRAME CHECKSUM (4) |
|---|---|---|---|---|

FIG.10B

| AD HOC INFO VALUE | DESCRIPTION |
|---|---|
| 192.168.xxxx.xxx (4) | PERSONAL IP FOR ELECTRONIC APPARATUS |
| xxxxxx (6) | SSID OF MOBILE TERMINAL |
| 0x00 OR 0x01 (1) | NETWORK AUTHENTICATION (PUBLIC OR SHARED) |
| 0x00 OR 0x01 (1) | DATA ENCRYPTION |
| xxxxxxxx (8) | WEP KEY OF MOBILE TERMINAL |

FIG.10C

SYSTEM, METHOD AND APPARATUS FOR WIRELESS NETWORK CONNECTION USING NEAR FIELD COMMUNICATION

PRIORITY

This application claims priority under 35 U.S.C. §119(a) to an application entitled "System, Method And Apparatus For Wireless Network Connection Using Near Field Communication" filed in the Korean Intellectual Property Office on Aug. 14, 2009 and assigned Serial No. 10-2009-0075440, the contents of which are incorporated herein by reference.

BACKGROUND OF THE INVENTION

1. Field of the Invention

The present invention relates generally to a system and method for a wireless network connection, and more particularly, to a system and method for a high speed wireless network connection using a near field communication network.

2. Description of the Related Art

A wireless network is generally used to interconnect Information Technology (IT) apparatuses, such as mobile terminals and notebooks, and electronic apparatuses, such as televisions, DVD players, and CD players, so that various services, such as content sharing, are enabled.

Various sharing schemes are used to share data between IT apparatuses and electronic apparatuses. Examples of such schemes include a Digital Living Network Alliance (DLNA) based sharing technology and a Windows shared folder technology.

The DLNA-based sharing technology, which shares digital content between various home electronic appliances for a digital home, uses Wi-Fi between electronic apparatuses capable of supporting the DLNA.

The Windows shared folder technology shares data using a sharing folder function supported by the Windows operating system and exchanges data between users having shared information.

The DLNA-based sharing technology or the Windows shared folder technology is used in order to share data between IT apparatuses and electronic apparatuses.

However, the DLNA-based sharing technology requires the installation of DLNA software within an electronic apparatus or an IT apparatus for data sharing, and an additional setting for a WiFi connection regardless of the DLNA setting, which can be inconvenient.

Further, the Windows shared folder technology is not intended for data sharing but only file transfer based on the Windows operating system.

SUMMARY OF THE INVENTION

The present invention has been made to address at least the above problems and/or disadvantages and to provide at least the advantages described below. Accordingly, an aspect of the present invention provides a system and method for establishing a wireless network connection between a mobile terminal and an electronic apparatus by using a near field communication network.

According to one aspect of the present invention, a system is provided for wireless network connection using a near field communication network. The system includes at least one electronic apparatus connected to the near field communication network. The system also includes a mobile terminal, which is connected to the near field communication network, that exchanges information with the at least one electronic apparatus for a wireless communication network connection through the connected near field communication network, and establishes the wireless communication network connection with the at least one electronic apparatus based on the exchanged information.

According to another aspect of the present invention, a method is provided for wireless network connection using a near field communication network in a wireless network connection system comprising at least one electronic apparatus and a mobile terminal. A near field communication network connected between the at least one electronic apparatus and the mobile terminal is established. Information for a wireless communication network connection is exchanged through the near field communication network connected between the at least one electronic apparatus and the mobile terminal. The wireless communication network connection is established between the at least one electronic apparatus and the mobile terminal based on the exchanged information.

According to a further aspect of the present invention, an apparatus is provided for wireless network connection using a near field communication network. The apparatus includes a transmission unit for transmitting a message to and receiving a message from at least one electronic apparatus connected to the near field communication network. The apparatus also includes a control unit for connecting the at least one electronic apparatus to the near field communication network, exchanging information for a wireless communication network connection through the connected near field communication network, and establishing the wireless communication network connection with the at least one electronic apparatus based on the exchanged information.

BRIEF DESCRIPTION OF THE DRAWINGS

The above and other aspects, features and advantages of the present invention will be more apparent from the following detailed description when taken in conjunction with the accompanying drawings, in which:

FIGS. 5A and 5B are diagrams illustrating a structure of a message transmitted and received between a mobile terminal and an electronic apparatus, according to an embodiment of the present invention;

FIGS. 6A and 6B are diagrams illustrating a structure of a network mode notification message, according to an embodiment of the present invention;

FIGS. 7A to 7E are diagrams illustrating structures of an AP information request message and a network setting notification message, according to an embodiment of the present invention;

FIGS. 10A to 10C are diagrams illustrating structures of an ad hoc information request message and an ad hoc information response message, according to an embodiment of the present invention.

DETAILED DESCRIPTION OF EMBODIMENTS OF THE PRESENT INVENTION

Figure 1A:
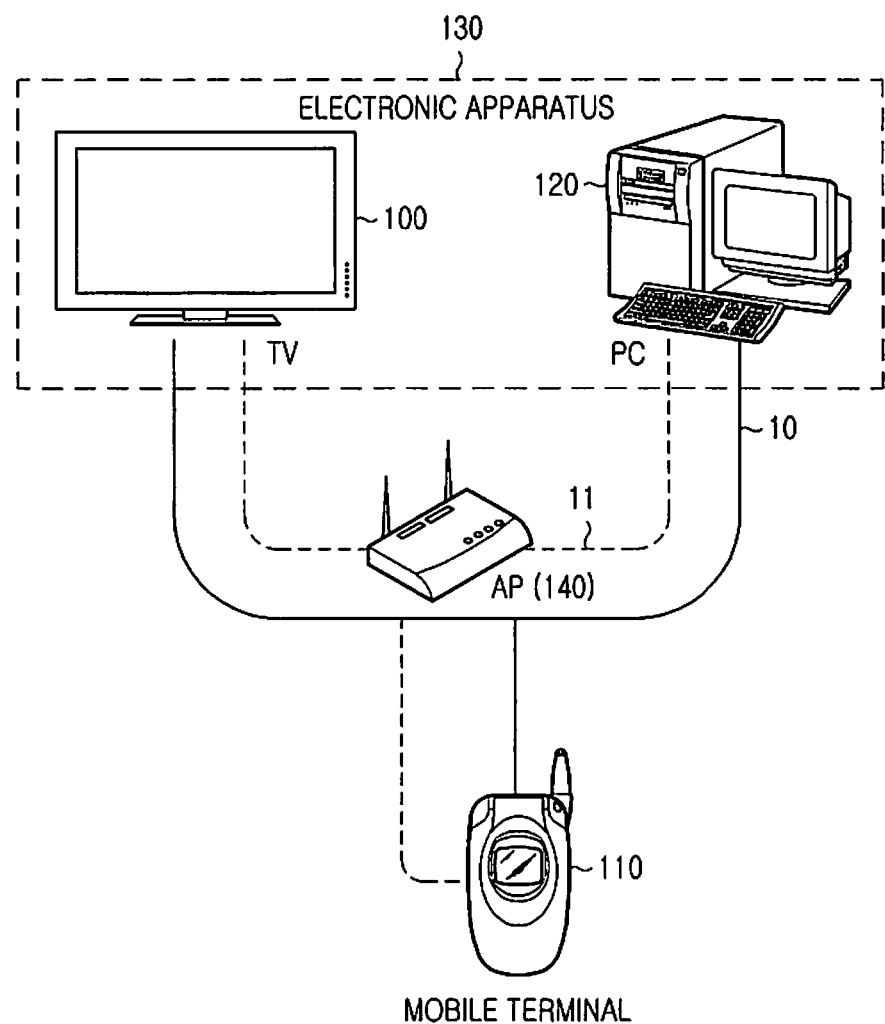
FIGS. 1A and 1B illustrate configurations of wireless communication network connection systems, according to embodiments of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1B:
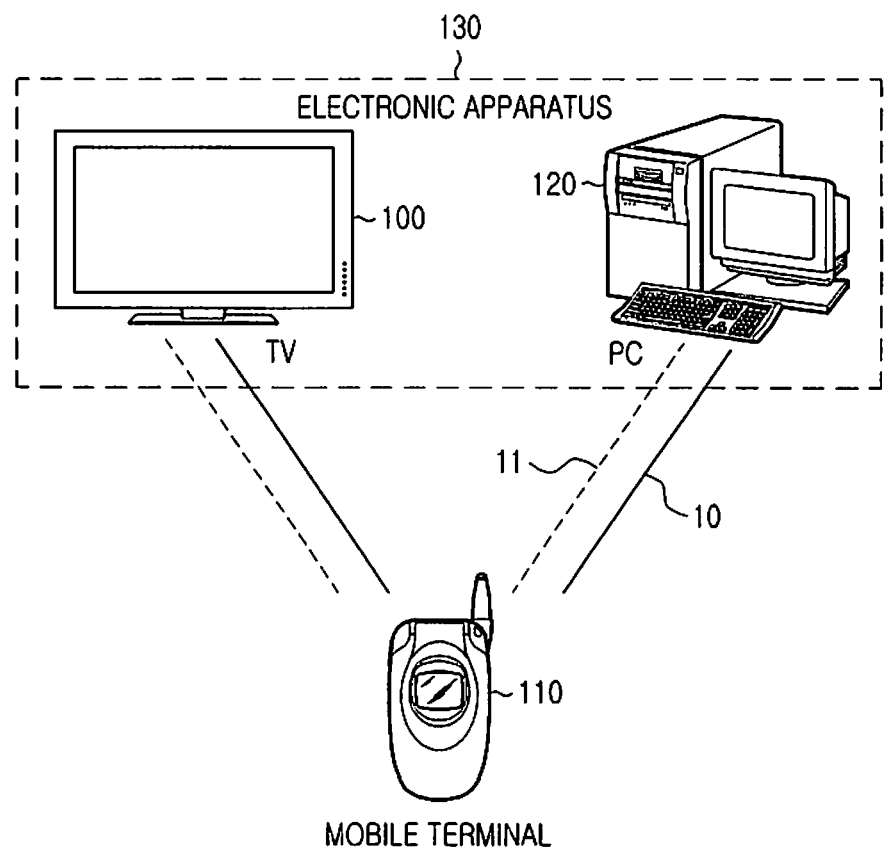

FIGS. 1A and 1B are diagrams illustrating configurations of wireless communication network connection systems, according to embodiments of the present invention.

Specifically, FIG. 1A illustrates a configuration of a system for establishing an infrastructure-based wireless communication network including an Access Point (AP), according to the first embodiment of the present invention. FIG. 1B illustrates a configuration of a system for establishing an ad hoc-based wireless communication network without an AP, according to the second embodiment of the present invention.

As shown in FIG. 1A, the wireless communication network connection system, according to the first embodiment of the present invention, includes an electronic apparatus 130, such as a television 100 and a Personal Computer (PC) 120, a mobile terminal 110, and an AP 140.

The first embodiment of the present invention is based on the assumption that a near field communication connection between the electronic apparatus 130 and the mobile terminal 110 has been established in advance as indicated by reference numeral 10 in FIG. 1A, and a wireless network connection between the PC 120 and the AP 140 has been established in advance as indicated by reference numeral 11 in FIG. 1A.

For example, when the electronic apparatus 130 and the AP 140 are connected to each other in advance and share information about the AP 140, the electronic apparatus 130 notifies the mobile terminal 110 that a wireless network to be established is an infrastructure-based network.

Thereafter, the mobile terminal 110 makes a request for AP information for establishment of an infrastructure-based wireless network to the electronic apparatus 130. Upon receiving the AP information from the electronic apparatus 130, the mobile terminal 110 establishes an infrastructure-based wireless network connection with the electronic apparatus 130.

As shown in FIG. 1B, the wireless communication network connection system, according to the second embodiment of the present invention, includes the electronic apparatus 130, such as the television 100 and the PC 120, and the mobile terminal 110. The second embodiment of the present invention is based on the assumption that the electronic apparatus 130 and the mobile terminal 110 have been connected to each other in advance through near field communication as indicated by reference numeral 10 in FIG. 1B.

When the electronic apparatuses share their ad hoc information, the electronic apparatus 130 notifies the mobile terminal 110 that the wireless network to be established is an ad hoc-based network.

Thereafter, the mobile terminal 110 transfers its ad hoc information to the electronic apparatus 130 in order to establish an ad hoc-based wireless network, and the electronic apparatus 130 establishes an ad hoc-based wireless network by using the received ad hoc information through the connection as indicated by reference numeral 11 of FIG. 1B. The established wireless network includes a high speed wireless network, such as Wi-Fi or Wibro.

According to the embodiments of the present invention as described above, it is possible to establish an infrastructure-based or ad hoc-based wireless network by using near field communication network information based on the existence or absence of an AP. Therefore, the embodiments of the present invention enable establishment of a wireless network in an easy and convenient manner.

Figure 2:
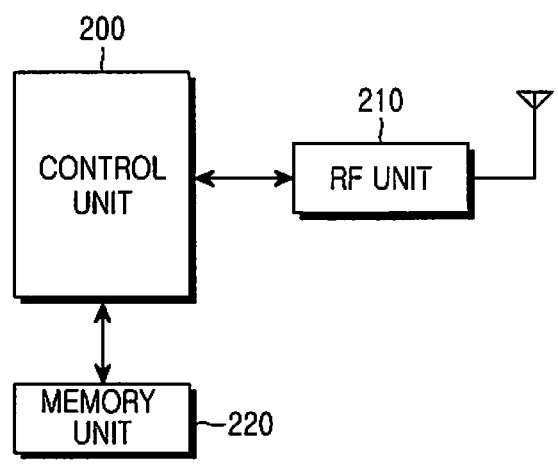
FIG. 2 is a block diagram illustrating a configuration of a mobile terminal, according to an embodiment of the present invention.

FIG. 2 is a block diagram illustrating a configuration of the mobile terminal 110, according to an embodiment of the present invention.

The mobile terminal 110 includes a control unit 200, a Radio Frequency (RF) unit 210, and a memory unit 220.

The control unit 200 controls the general operation of the mobile terminal 110. When the control unit 200 has received network mode information, which indicates the type of wireless network to be established, from the electronic apparatus 130 after establishing near field communication with the electronic apparatus 130, the control unit 200 identifies the received network mode information. When the identified network mode information indicates an infrastructure mode, the mobile terminal 110 makes a request for AP information to the electronic apparatus 130. When the identified network mode information indicates an ad hoc mode, the mobile terminal 110 transfers its own ad hoc information to the electronic apparatus 130 or makes a request for ad hoc information to the electronic apparatus 130.

Upon receiving the AP information or ad hoc information from the electronic apparatus 130, the mobile terminal 110 establishes an infrastructure-based wireless communication network or an ad hoc-based wireless communication network by using the received AP information or ad hoc information.

The RF unit 210 delivers a request for AP information or ad hoc information to the electronic apparatus 130, and receives information or ad hoc information from the electronic apparatus 130. Further, the RF unit 210 transmits or receives a request or a response between the mobile terminal 110 and the electronic apparatus 130.

The memory unit 220 stores the request transmitted or response received between the mobile terminal 110 and the electronic apparatus 130, and stores network mode information and AP information or ad hoc information received from the electronic apparatus 130.

Figure 3A:
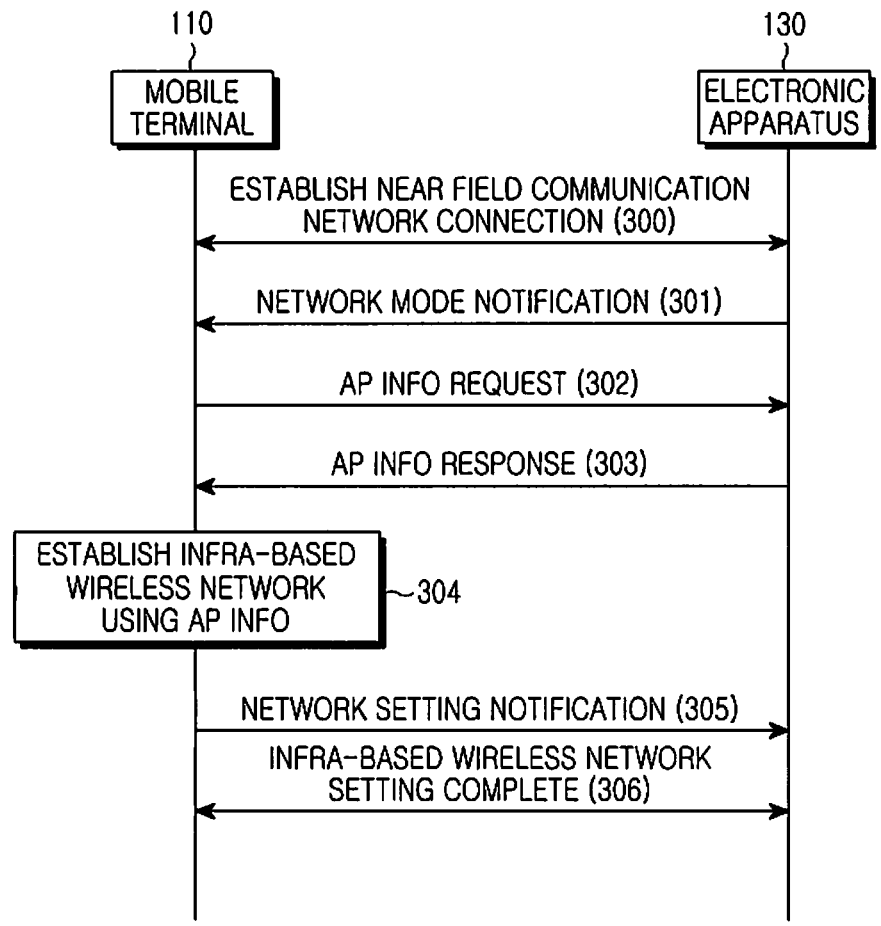
FIGS. 3A and 3B are signal flow diagrams illustrating a process for establishment of an infrastructure based wireless communication network or an ad hoc based wireless communication network between a terminal and an electronic apparatus, according to an embodiment of the present invention.
Figure 3B:
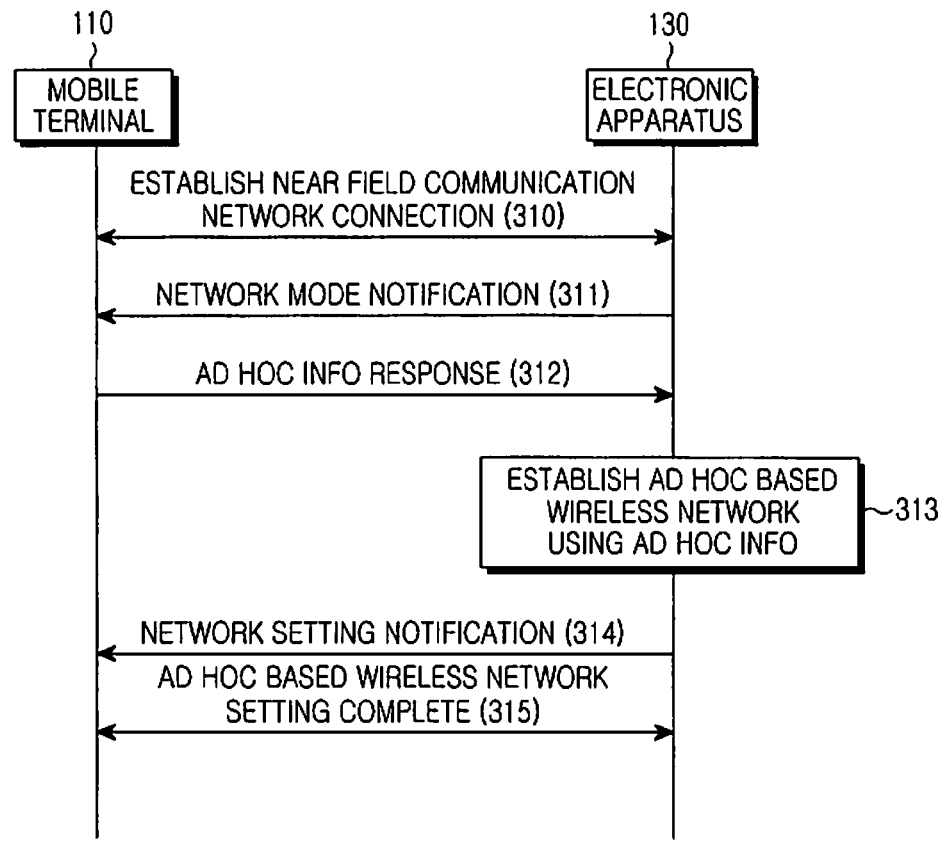

FIGS. 3A and 3B are signal flow diagrams illustrating a process for establishment of an infrastructure-based wireless communication network or an ad hoc-based wireless communication network between a terminal and an electronic apparatus, according to an embodiment of the present invention.

FIG. 3A illustrates a process for establishment of an infrastructure-based wireless communication network including an AP, according to the first embodiment of the present invention. FIG. 3B illustrates a process for establishment of an ad hoc-based wireless communication network without an AP, according to the second embodiment of the present invention.

Referring to FIG. 3A, the mobile terminal 110 establishes a near field communication network connection with the electronic apparatus 130 in step 300. A near field communication network, such as Radio Frequency for Consumer Electronics (RF4CE), may be established according to the embodiment of the present invention. The RF4CE includes communication networks of low speed and low power, such as a Wireless Personal Area Network (WPAN), a zigbee communication network, and an Ultra Wide Band (UWB) communication network. In such a near field communication connection, the electronic apparatus 130 enciphers network mode information about the wireless network to be established, and exchanges the enciphered information with the mobile terminal 110.

In step 301, the electronic apparatus 130 notifies the mobile terminal 110 of the network mode of the wireless communication network to be established. The network mode corresponds to one of the infrastructure-based network mode including an AP, the ad hoc-based network mode without an AP, and a network non-connection mode in which a network is not connected.

If the notified network mode is the infrastructure-based network mode, the mobile terminal 110 requests information on the AP 140, having been connected with the electronic apparatus 130 through near field communication, in step 302.

In step 303, in response to the request, the electronic apparatus 130 transmits AP information to the mobile terminal 110.

In step 304, the mobile terminal 110 establishes the infrastructure-based wireless communication network connection with the electronic apparatus 130 by using the received AP information. The mobile terminal 110 performs Internet Protocol (IP) setting and network setting using the AP information during the establishment of the infrastructure-based wireless communication network connection with the electronic apparatus 130. Specifically, during the IP setting, the mobile terminal 110 may set automatic reception of an IP or a Domain Name System (DNS) address by using a Domain Host Configuration Protocol (DHCP). Further, in the network setting, by using the AP information, the mobile terminal 110 may allow the use of a wireless network configuration in a Windows environment without use of a firewall, and may allow access to all usable networks.

In step 305, the mobile terminal 110 delivers information, which indicates if the wireless network connection has succeeded or failed, to the electronic apparatus 130, thereby reporting success or failure of the network setting.

In step 306, the mobile terminal 110 completes the infrastructure-based network setting with the electronic apparatus 130.

Referring to FIG. 3B, the mobile terminal 110 establishes a near field communication connection with the electronic apparatus 130 in step 310. As described above, the electronic apparatus 130 enciphers network mode information about the wireless network to be established and exchanges the enciphered information with the mobile terminal 110.

In step 311, the electronic apparatus 130 notifies the mobile terminal 110 of the network mode of the wireless communication network to be established.

If the notified network mode is the ad hoc mode, the mobile terminal 110 transfers its own ad hoc information to the electronic apparatus 130 in step 312. The ad hoc information includes a Service Set Identifier (SSID) of the mobile terminal 110, information reporting if the network authentication corresponds to an open mode or a sharing mode, information reporting if Wired Equivalent Privacy (WEP) is used for data enciphering, and a WEP key of the mobile terminal 110.

In step 313, using the received ad hoc information, the electronic apparatus 130 establishes an ad hoc-based wireless network connection between the mobile terminal 110 and the electronic apparatus 130. While establishing the ad hoc-based wireless network connection between the mobile terminal 110 and the electronic apparatus 130, the electronic apparatus 130 performs IP setting and network setting using AP information. Specifically, the mobile terminal 110 may use a private IP or a subnet mask in the IP setting. Further, in the network setting, using the AP information, the mobile terminal 110 may allow use of a wireless network configuration in a Windows environment without use of a firewall, and may allow access to all usable networks.

In step 314, the electronic apparatus 130 delivers information, which indicates if the wireless network connection has succeeded or failed, to the mobile terminal 110, thereby reporting success or failure of the network setting.

In step 315, the electronic apparatus 130 completes the infrastructure based network setting with the mobile terminal 110.

Through the above process, the embodiments of the present invention enable an easy and convenient wireless network connection between a mobile terminal and an electronic apparatus by using near field communication set in advance.

Figure 4A:
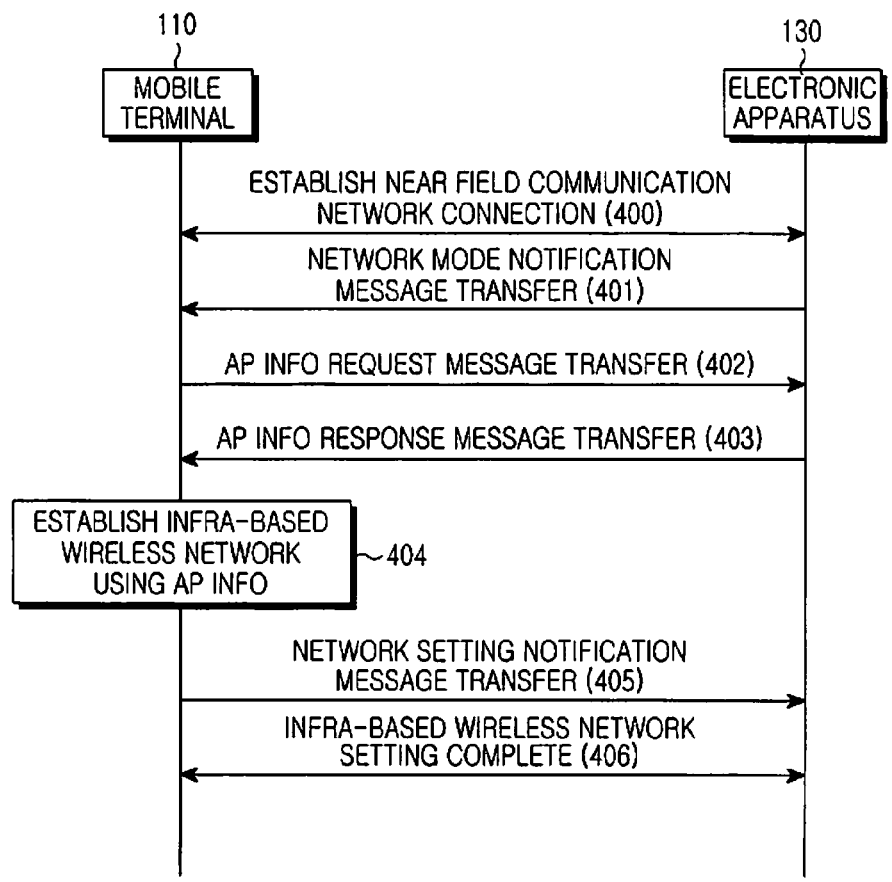
FIGS. 4A and 4B are signal flow diagrams illustrating processes for establishing an infrastructure based wireless communication network connection, according to the first embodiment of the present invention.
Figure 4B:
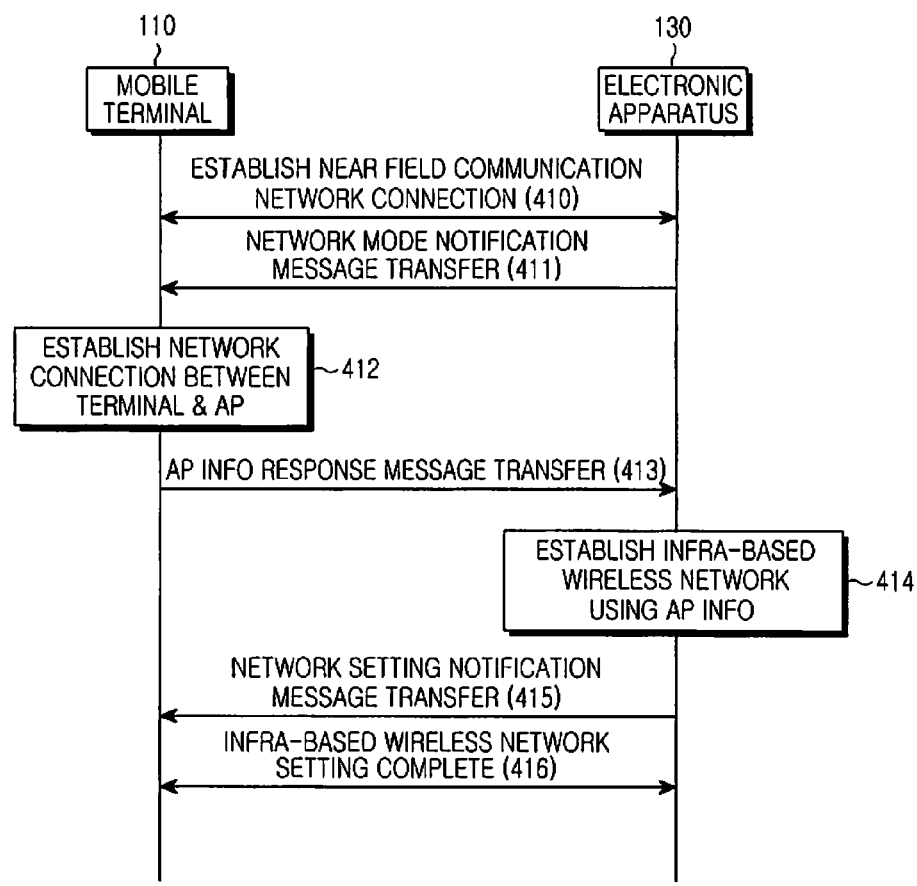

FIGS. 4A and 4B are signal flow diagrams illustrating processes for establishing an infrastructure based wireless communication network connection, according to the first embodiment of the present invention.

Specifically. FIG. 4A illustrates a process for establishing an infrastructure-based wireless communication network connection, in a state in which an AP exists and the AP is connected in advance to an electronic apparatus through the network. FIG. 4B illustrates a process for establishing an infrastructure-based wireless communication network connection, in a state in which an AP exists but the AP is not connected to the electronic apparatus.

Referring to FIG. 4A, the mobile terminal 110 and the electronic apparatus 130 establish a near field communication connection in step 400.

In step 401, the electronic apparatus 130 transfers a network mode notification message, including network mode information of a wireless network to be established, to the mobile terminal 110. Messages transmitted and received between the mobile terminal 110 and the electronic apparatus 130 may have a configuration as shown in FIG. 5A.

Referring to FIG. 5A, the message transmitted and received between the mobile terminal 110 and the electronic apparatus 130 includes a frame control field, a frame counter field, a command identifier field, a command payload field, and a frame checksum field. Such a data structure is based on the message structure of the RF4CE.

In the embodiments of the present invention, a reserved area having a value of "00" from among the frame control field values is defined as a wireless network message frame, and "0x09"~"0xff", which are reserved areas from among the command identifier field values, are defined as shown in FIG. 5B.

For example, as noted from FIG. 5B, the command identifier field having a value of "0x0A" indicates that the current message is a network mode notification message, and the command identifier field having a value of "0x0B" indicates that the current message is an AP information request message.

As shown in FIG. 6A, the network mode notification message includes a frame control field, a frame counter field, a command identifier field, a network mode field, and a frame checksum field.

In the network mode notification message, the frame control field has a value of "00" and the command identifier field has a value of "0x0A". The network mode notification message has network mode field values as shown in FIG. 6B, wherein the network non-connection mode having no network connection has a value of "0x00", the ad hoc mode has a value of "0x01", and the infrastructure mode has a value of "0x02".

Referring again to FIG. 4A, the network mode notification message transferred by the electronic apparatus 130 in step 401 has the network mode field value of "0x02", which indicates that the network is an infrastructure based network.

In step 402, the mobile terminal 110 transfers an AP information request message for requesting information on the AP 140, having been connected with the electronic apparatus 130, to the electronic apparatus 130. The AP information request message has a configuration as shown in FIG. 7A and has a frame control field value of "00" and a command identifier field value of "0x0B".

In step 403, the electronic apparatus 130 transfers an AP information response message, including the request AP information, to the mobile terminal 110.

The AP information response message includes a frame control field, a frame counter field, a command identifier field, an AP information field, and a frame checksum field as shown in FIG. 7B. The AP information field has AP information values as shown in FIG. 7C.

The AP information response message has a frame control field value of "00" and a frame counter field value of "0x0C", and includes an SSID of the AP as an AP information value, information reporting if the network authentication corresponds to an open mode or a sharing mode, information reporting if a WEP is used for data enciphering, and a WEP key of the AP.

In step 404, the mobile terminal 110 establishes an infrastructure-based wireless network with the electronic apparatus 130 by using the received AP information.

In step 405, the mobile terminal 110 transfers a network setting notification message, which notifies a result of the establishment of the wireless network with the electronic apparatus 130, to the electronic apparatus 130. The network setting notification message includes a frame control field, a frame counter field, a command identifier field, a network setting field, and a frame checksum field as shown in FIG. 7D. The network setting field has network setting values indicating a success or a failure as shown in FIG. 7E.

In step 406, the mobile terminal 110 and the electronic apparatus 130 complete the infrastructure-based wireless network setting between them.

Referring to FIG. 4B, the mobile terminal 110 and the electronic apparatus 130 establish a near field communication connection in step 410.

In step 411, the electronic apparatus 130 transfers a network mode notification message, including network mode information of a wireless network to be established, to the mobile terminal 110. The network mode notification message includes a network non-connection mode information indicating that a communication connection with the AP 140 has not been established.

Upon receiving the network mode notification message, the mobile terminal 110 establishes a near field communication network connection with a proximately located AP in step 412.

In step 413, the mobile terminal 110 transfers an AP information response message, including information on the AP 140 connected through the near field communication network, to the electronic apparatus 130. The AP information response message includes an SSID of the AP, information reporting if the network authentication corresponds to an open mode or a sharing mode, information reporting if a WEP is used for data enciphering, and a WEP key of the AP, as described above.

In step 414, the electronic apparatus 130, having received the AP information response message, establishes an infrastructure based wireless network with the mobile terminal 110 by using the AP information included in the received response message.

In step 415, the electronic apparatus 130 transfers a network setting notification message, which notifies a result of the establishment of the wireless network with the mobile terminal 110, to the mobile terminal 110.

In step 416, the mobile terminal 110 and the electronic apparatus 130 complete the infrastructure based wireless network setting.

Through the above process, the embodiments of the present invention enable an easy and convenient wireless network connection between a mobile terminal and an electronic apparatus by using near field communication set in advance through an AP.

Figure 8:
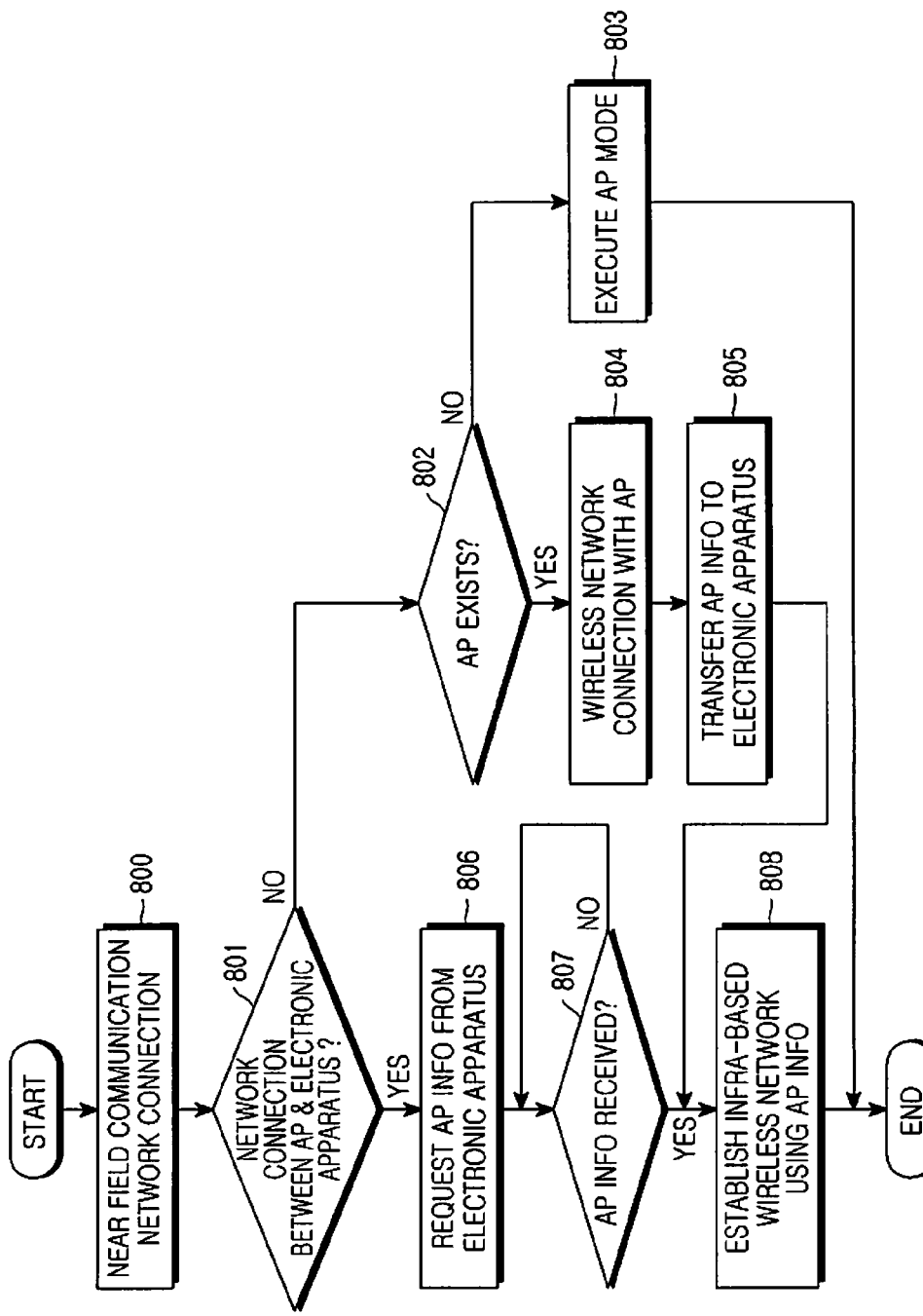
FIG. 8 is a flowchart illustrating a process of establishing an infrastructure based wireless communication network including an AP between a mobile terminal and an electronic apparatus by the mobile terminal in a system for establishing the network, according to the first embodiment of the present invention.

FIG. 8 is a flowchart illustrating a process of establishing an infrastructure based wireless communication network, including an AP, between a mobile terminal and an electronic apparatus by the mobile terminal in a system for establishing the network, according to the first embodiment of the present invention.

Referring to FIG. 8, in step 800, the control unit 200 of the mobile terminal 110 establishes near field communication with the electronic apparatus 130. According to the embodiment of the present invention, it is possible to previously establish a near field communication network between the mobile terminal 110 and the electronic apparatus 130 by using a near field communication connection scheme, such as the RF4CE.

Upon receiving a network mode notification message relating to the connected near field communication network from the electronic apparatus 130, the control unit 200 determines if there is a wireless network connection between the AP 140 and the electronic apparatus 130, in step 801. The mobile terminal 110 can use the network mode notification message received from the electronic apparatus 130 in order to determine if there is an AP.

The control unit 200 identities the wireless network connection between the AP 140 and the electronic apparatus 130 through a network mode setting value included in the network mode notification message.

When there is a wireless network connection between the AP 140 and the electronic apparatus 130, the control unit 200 of the mobile terminal 110 proceeds to step 806. Otherwise, the control unit 200 proceeds to step 802, in which the control unit 200 determines if there is an AP 140 located near the mobile terminal 110.

When there is an AP 140 located near the mobile terminal 110, the control unit 200 proceeds to step 804. Otherwise, the control unit 200 proceeds to step 803, in which the control unit 200 performs an ad hoc-based wireless network connection process.

In step 804, the control unit 200 of the mobile terminal 110 establishes a wireless network connection with the proximately located AP 140. The mobile terminal 110 uses a wireless network connection method in order to establish the wireless network connection.

In step 805, the mobile terminal 110 generates an AP information response message, including information on the connected AP 140, and transfers the generated message to the electronic apparatus 130.

In step 806, the control unit 200 of the mobile terminal 110 generates an AP information request message for requesting the information on the connected AP, and transfers the generated request message to the electronic apparatus 130.

In step 807, the control unit 200 determines if the requested AP information is received from the electronic apparatus 130. When the requested AP message is received, the control unit 200 proceeds to step 808. Otherwise, the control unit 200 continuously performs step 807, in which the control unit 200 continuously determines if the requested AP information is received.

In step 808, the control unit 200 of the mobile terminal 110 completes the establishment of the infrastructure-based wireless network connection between the mobile terminal 110 and the electronic apparatus 130 by using the AP information.

Through the above process, an embodiment of the present invention enables an easy and convenient establishment of a wireless network connection between a mobile terminal and an electronic apparatus by using near field communication set in advance in a near field communication network environment in which an AP exists.

Figure 9A:
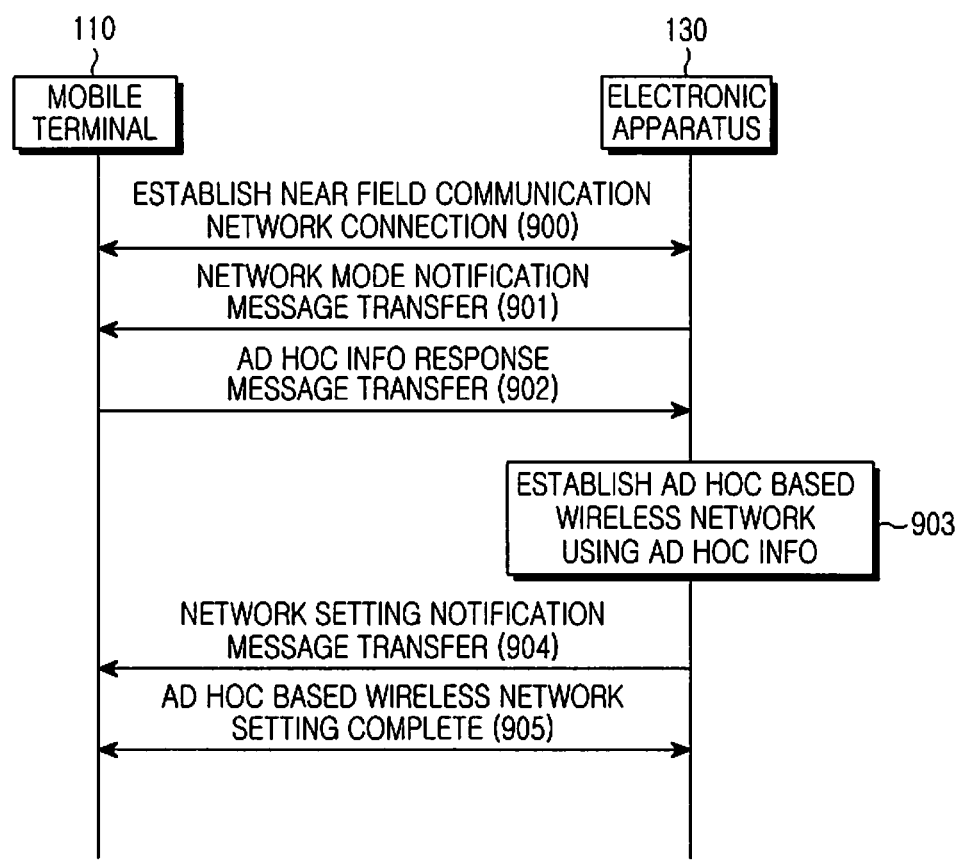
FIGS. 9A and 9B are signal flow diagrams illustrating processes for establishing an ad hoc based wireless communication network connection, according to a second embodiment of the present invention.
Figure 9B:
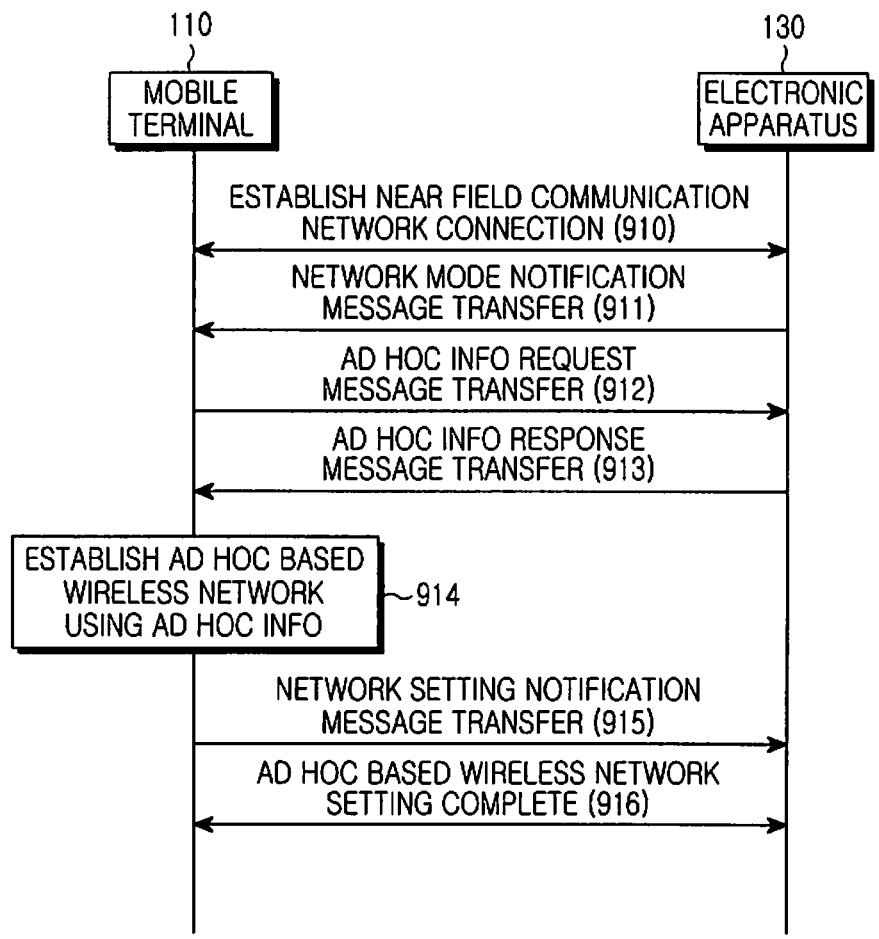

FIGS. 9A and 9B are signal flow diagrams illustrating processes for establishing an ad hoc-based wireless communication network connection, according to the second embodiment of the present invention.

FIG. 9A illustrates a process for establishing an ad hoc-based wireless communication network connection by using near field communication connected in advance between a mobile terminal and an electronic apparatus without an AP, FIG. 9B illustrates a process for connecting to an ad hoc-based wireless communication network by a mobile terminal in a state in which the ad hoc based wireless communication network has been established in advance between electronic apparatuses.

Referring to FIG. 9A, the mobile terminal 110 and the electronic apparatus 130 establish a near field communication connection in step 900.

In step 901, the electronic apparatus 130 transfers a network mode notification message, including network mode information of a wireless network to be established, to the mobile terminal 110. Messages transmitted and received between the mobile terminal 110 and the electronic apparatus 130 may have a configuration as shown in FIG. 10A.

In step 902, if the network mode notification message received from the electronic apparatus 130 is a message notifying that the network mode is the ad hoc mode, the mobile terminal 110 transfers an ad hoc information response message including its own ad hoc information to the electronic apparatus 130. The ad hoc information response message includes a frame control field, a frame counter field, a command identifier field, an ad hoc information field, and a frame checksum field as shown in FIG. 10B.

The ad hoc information response message as described above has a frame control field value of "00" and a command identifier field value of "0x0E", and has ad hoc information values as shown in FIG. 10C. Referring to FIG. 10C, the ad hoc information values include a private IP of the electronic apparatus, an SSID of the mobile terminal, information reporting if the network authentication corresponds to an open mode or a sharing mode, information reporting if a WEP is used for data enciphering, and a WEP key of the AP.

In step 903, using the ad hoc information included in the received ad hoc information response message, the electronic apparatus 130 establishes an ad hoc-based wireless network connection between the mobile terminal 110 and the electronic apparatus 130.

In step 904, the electronic apparatus 130 transfers a network setting notification message, which indicates a result of the wireless network establishment between the mobile terminal 110 and the electronic apparatus 130, to the mobile terminal 110. The network setting notification message has a message structure as shown in FIG. 7D.

In step 905, the mobile terminal 110 and the electronic apparatus 130 complete the ad hoc-based network establishment.

Referring to FIG. 9B, the mobile terminal 110 and the electronic apparatus 130 establish a near field communication connection in step 910.

In step 911, the electronic apparatus 130 transfers a network mode notification message, including network mode information of a wireless network to be established, to the mobile terminal 110.

In step 912, when the network mode notification message received from the electronic apparatus 130 is a message notifying that the network mode is the ad hoc mode and an ad hoc based wireless network has been established in advance between the electronic apparatuses, the mobile terminal 110 generates an ad hoc information request message for requesting ad hoc information of the established wireless network, and transfers the generated ad hoc information request message to the electronic apparatus 130. The ad hoc information request message includes a frame control field, a frame counter field, a command identifier field, and a frame checksum field as shown in FIG. 10A, and has a frame control field value of "00" and a command identifier field value of "0x0D".

In step 913, the electronic apparatus 130 transfers an ad hoc information response message including the requested ad hoc information to the mobile terminal 110.

In step 914, using the ad hoc information included in the received ad hoc information response message, the mobile terminal 110 establishes an ad hoc-based wireless network connection between the mobile terminal 110 and the electronic apparatus 130.

In step 915, the mobile terminal 110 transfers a network setting notification message, which indicates a result of the wireless network establishment between the mobile terminal 110 and the electronic apparatus 130, to the electronic apparatus 130. The network setting notification message has a message structure as shown in FIG. 7D.

In step 916, the mobile terminal 110 and the electronic apparatus 130 complete the ad hoc-based network establishment.

Through the above process, the embodiment of the present invention enables an easy and convenient ad hoc-based wireless network connection between a mobile terminal and an electronic apparatus in an environment without an AP, and allows an easy participation of a mobile terminal in a previously established ad hoc-based wireless network.

Figure 11:
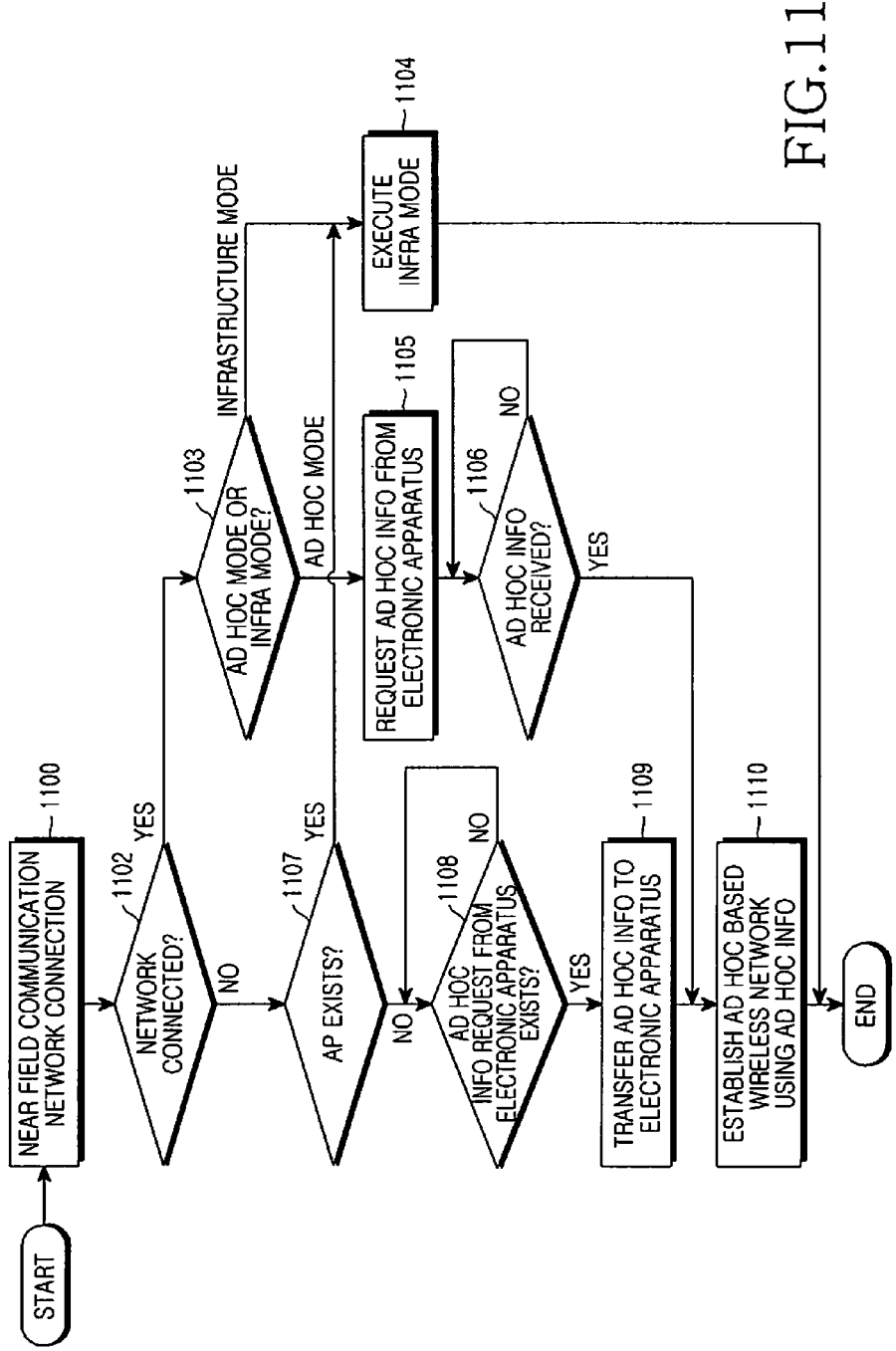
FIG. 11 is a flowchart illustrating a process of establishing an ad hoc based wireless communication network without an AP between a mobile terminal and an electronic apparatus by the mobile terminal in a system for establishing the network, according to the second embodiment of the present invention.

FIG. 11 is a flowchart illustrating a process of establishing an ad hoc-based wireless communication network without an AP between a mobile terminal and an electronic apparatus by the mobile terminal in a system for establishing the network, according to the second embodiment of the present invention.

Referring to FIG. 11, in step 1100, the control unit 200 of the mobile terminal 110 establishes near field communication with the electronic apparatus 130. According to an embodiment of the present invention, it is possible to establish a near field communication network between the mobile terminal 110 and the electronic apparatus 130 by using a near field communication connection scheme, such as the RF4CE or WPAN.

Upon receiving a network mode notification message, relating to the connected near field communication network, from the electronic apparatus 130, the control unit 200 identifies the received network mode notification message, so as to determine if a network connection has been established in step 1102.

As a result of the determination, when a network connection has been established, the control unit 200 proceeds to step 1103. Otherwise, the control unit 200 proceeds to step 1107.

In step 1103, the control unit 200 determines if the network mode information included in the received network mode response message indicates the ad hoc mode or the infrastructure mode. The control unit 200 proceeds to step 1105 for the ad hoc mode, and proceeds to step 1104 for the infrastructure mode, in which the control unit 200 performs the infrastructure based wireless network connection process.

When an ad hoc-based wireless network has been established between electronic apparatuses, the control unit 200 makes a request for ad hoc information of the established wireless network to the electronic apparatus 130, in step 1105.

In step 1106, the mobile terminal 110 determines if the requested ad hoc information is received. When the requested ad hoc information is received, the control unit 200 of the mobile terminal 110 proceeds to step 1110. Otherwise, the control unit 200 of the mobile terminal 110 continuously performs step 1106 in which the mobile terminal 110 determines if the requested ad hoc information is received.

In step 1107, the control unit 200 determines if there is an AP located near the mobile terminal 110. When there is an AP located near the mobile terminal 110, the control unit 200 proceeds to step 1104, in which the control unit 200 performs the infrastructure-based wireless network establishment. Otherwise, the control unit 200 proceeds to step 1108.

In step 1108, the control unit 200 determines if an ad hoc information request message is received from the electronic apparatus 130. When an ad hoc information request message is received, the control unit 200 proceeds to step 1109. Otherwise, the control unit 200 continuously performs step 1108, in which the control unit 200 determines if an ad hoc information request message for requesting ad hoc information is received from the electronic apparatus 130.

In step 1109, the mobile terminal 110 generates an ad hoc information response message, including the requested ad hoc information, and transfers the generated message to the electronic apparatus 130.

In step 1110, the control unit 200 of the mobile terminal 110 completes the establishment of the ad hoc-based wireless network connection between the mobile terminal 110 and the electronic apparatus 130 by using the ad hoc information.

Through the above process, the embodiment of the present invention enables an easy and convenient establishment of a wireless network connection between a mobile terminal and an electronic apparatus by using near field communication set in advance in a near field communication network environment in which an AP does not exist.

According to embodiments of the present invention described above, it is possible to exchange information necessary for a wireless network connection through a previously connected near field communication network, and establish a wireless network connection between a mobile terminal and an electronic apparatus by using the exchanged information. A user can then establish a wireless network connection between the mobile terminal and the electronic apparatus in an easy and convenient manner.

Also, according to embodiments of the present invention, by exchanging information necessary for a wireless network establishment using near field communication, it is possible to easily establish a wireless network connection without an additional wireless network apparatus for establishment of the wireless network.

Further, embodiments of the present invention allow for establishment of both an infrastructure mode and an ad hoc mode for a high speed wireless network, such as Wi-Fi, in establishing a near field communication network, such as the RF4CE.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for wireless network connection using a near field communication network in a wireless network connection system comprising at least one electronic apparatus and a mobile terminal, the method comprising:

exchanging connection information for connecting a wireless communication network between the at least one electronic apparatus and a mobile terminal with the at least one electronic apparatus through near field communication network connected between the at least one electronic apparatus and the mobile terminal; and establishing the wireless communication network connection between the at least one electronic apparatus and the mobile terminal based on the exchanged connection information, wherein the connection information includes network mode information indicating one of types of wireless communication network to be able to be connected between the at least one electronic apparatus and the mobile terminal, wherein the network mode information comprises information on at least one of an ad hoc-based network mode, an infrastructure-based network mode, and a network non-connection mode, and wherein the method further comprises:

establishing the near field communication network connection with an access point; and making a request for information on the access point to the at least one electronic apparatus when the mobile terminal has received the network mode information comprising information on the infrastructure-based network mode from the at least one electronic apparatus.

2. The method of claim 1, further comprising:

receiving the requested information on the access point from the at least one electronic apparatus; and establishing the wireless communication network connection with the at least one electronic apparatus by using information on the access point.

3. An apparatus for wireless network connection using a near field communication network, the apparatus comprising:

a transmission unit for transmitting a message to and receiving a message from at least one electronic apparatus connected to the near field communication network; and a control unit for exchanging connection information for connecting a wireless communication network between the at least one electronic apparatus and a mobile terminal with the at least one electronic apparatus through the connected near field communication between the at least one electronic apparatus and the mobile terminal, and establishing the wireless communication network connection between the at least one electronic apparatus and the mobile terminal based on the exchanged connection information, wherein the connection information includes network mode information indicating one of types of wireless communication network to be able to be connected between the at least one electronic apparatus and a mobile terminal, wherein the network mode information comprises information on at least one of an ad hoc-based network mode, an infrastructure-based network mode, and a network non-connection mode, and wherein the control unit makes a request for information on an access point to the at least one electronic apparatus when it has received the network mode information comprising information on the infrastructure-based network mode from the at least one electronic apparatus.

4. The apparatus of claim 3, wherein the control unit establishes the wireless communication network connection with the at least one electronic apparatus by using the information on the access point when the apparatus has received the information on the access point from the at least one electronic apparatus in response to the request.

* * * * *